(12) United States Patent
Morin et al.

(10) Patent No.: US 9,277,014 B2
(45) Date of Patent: Mar. 1, 2016

(54) HANDLING OF AUXILIARY NAS

(71) Applicant: ALCATEL LUCENT CANADA, INC., Ottawa (CA)

(72) Inventors: Steve Morin, Ottawa (CA); Shanawaz Shaik, Ottawa (CA); Xiaoning Wang, Kanata (CA); Aizaz Alam, Mississauga (CA); Ivaylo Tanouchev, Ottawa (CA); Dai Truong, Ottawa (CA); Justin Newcomb, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 192 days.

(21) Appl. No.: 13/921,652

(22) Filed: Jun. 19, 2013

(65) Prior Publication Data

US 2014/0379933 A1 Dec. 25, 2014

(51) Int. Cl.
*H04L 29/08* (2006.01)
*H04L 12/801* (2013.01)

(52) U.S. Cl.
CPC ............... *H04L 67/14* (2013.01); *H04L 47/10* (2013.01)

(58) Field of Classification Search
CPC ............................... H04L 47/10; H04L 63/08
See application file for complete search history.

(56) References Cited

U.S. PATENT DOCUMENTS

| | | | |
|---|---|---|---|
| 6,628,671 B1 * | 9/2003 | Dynarski et al. | 370/469 |
| 8,516,586 B1 * | 8/2013 | Jensen et al. | 726/23 |
| 8,805,980 B1 * | 8/2014 | Synnestvedt | 709/223 |
| 8,892,665 B1 * | 11/2014 | Rostami-Hesarsorkh et al. | 709/206 |
| 8,973,088 B1 * | 3/2015 | Leung et al. | 726/1 |
| 2005/0235000 A1 * | 10/2005 | Keil | 707/200 |
| 2007/0076607 A1 * | 4/2007 | Voit et al. | 370/230 |
| 2007/0094712 A1 * | 4/2007 | Gibbs et al. | 726/3 |
| 2013/0246639 A1 * | 9/2013 | Nedbal et al. | 709/228 |
| 2014/0032383 A1 * | 1/2014 | Wang | 705/32 |
| 2014/0096214 A1 * | 4/2014 | Sheth et al. | 726/7 |
| 2015/0026794 A1 * | 1/2015 | Zuk et al. | 726/13 |

* cited by examiner

*Primary Examiner* — Lashonda Jacobs
(74) *Attorney, Agent, or Firm* — Kramer & Amado, P.C.

(57) ABSTRACT

Various exemplary embodiments relate to a method and related network node including: receiving, at the network device, a traffic message including an IP address; identifying the traffic message as belonging to a new session; generating a request message based on identifying the traffic message as belonging to a new session, wherein the request message includes the IP address; transmitting the request message to a policy server; and receiving, from the policy server, a policy message including a policy. Various exemplary embodiments relate to a method and related network node including: receiving, at the policy server, a request message from a network device, the request message including a subscriber IP and a network device identifier; identifying a subscriber session associated with the IP address; recording the network device identifier in association with the subscriber session; retrieving a policy associated with the subscriber session; and transmitting the policy to the network device.

22 Claims, 6 Drawing Sheets

| SELF | PEER |
|---|---|
| 213.124.1.1:2 | 213.124.21.1:2 |
| 213.124.1.1:5 | 213.124.1.81:3 |
| . . . | . . . |

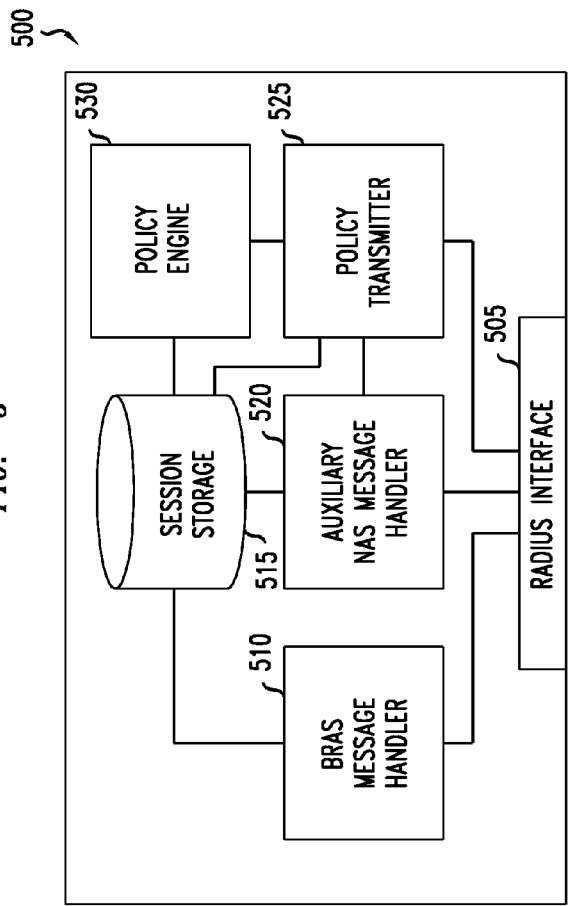

US 9,277,014 B2

HANDLING OF AUXILIARY NAS

TECHNICAL FIELD

Various exemplary embodiments disclosed herein relate generally to communications networking.

BACKGROUND

Many communications networks, such as subscription-based access networks, utilize gateway devices to provide user devices with access to a network. Such a network access server ("NAS") may enforce policies involving functions such as, for example, traffic filtering, quality of service (QoS) assurance, and usage monitoring for charging. These policies may be delivered to the NAS for enforcement by a central policy server with access to subscriber information and network operator configurations. In some deployments, multiple NASs may be utilized for different functions. For example, a primary NAS may provide network access and enforce QoS requirements, while an auxiliary NAS may perform deep packet inspection (DPI) to perform application-specific traffic management such as limiting file sharing traffic or enriching HTTP with subscriber information.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a network device for obtaining policy information, the method including: receiving, at the network device, a traffic message including an IP address; identifying the traffic message as belonging to a new session; generating a request message based on identifying the traffic message as belonging to a new session, wherein the request message includes the IP address; transmitting the request message to a policy server; and receiving, from the policy server, a policy message including a policy.

Various exemplary embodiments relate to a network device for obtaining policy information, the network device including: a network interface configured to receive a traffic message including an IP address; a traffic processor configured to identify the traffic message as belonging to a new session; a request message generator configured to: generate a request message based on identifying the traffic message as belonging to a new session, wherein the request message includes the IP address, and transmit the request message to a policy server via the network interface; and a response message handler configured to receive, from the policy server, a policy message including a policy.

Various exemplary embodiments relate to a non-transitory machine-readable storage medium encoded with instructions for execution by a network device for obtaining policy information, the medium including: instructions for receiving, at the network device, a traffic message including an IP address; instructions for identifying the traffic message as belonging to a new session; instructions for generating a request message based on identifying the traffic message as belonging to a new session, wherein the request message includes the IP address; instructions for transmitting the request message to a policy server; and instructions for receiving, from the policy server, a policy message including a policy.

Various embodiments are described wherein the request message further includes an identifier of the network device.

Various embodiments additionally include identifying a peer device associated with the network device, wherein the request message further includes an identifier of the peer device.

Various embodiments are described wherein identifying a peer device includes: determining an incoming port associated with the traffic message; and identifying the peer device as being associated with the incoming port.

Various embodiments are described wherein the network device is a network access server (NAS).

Various embodiments are described wherein the request message and the policy message are both RADIUS messages.

Various exemplary embodiments relate to a method performed by a policy server for distributing policy information, the method including: receiving, at the policy server, a request message from a network device, the request message including a subscriber IP address and a network device identifier; identifying a subscriber session associated with the IP address; recording the network device identifier in association with the subscriber session; retrieving a policy associated with the subscriber session; and transmitting the policy to the network device.

Various exemplary embodiments relate to a policy server for distributing policy information, the policy server including: a network interface configured to receive a request message from a network device, the request message including a subscriber IP address and a network device identifier; a request message handler configured to: identify a subscriber session associated with the IP address, and record the network device identifier in association with the subscriber session; and a policy transmitter configured to: retrieve a policy associated with the subscriber session; and transmit the policy to the network device via the network interface.

Various exemplary embodiments relate to a non-transitory machine-readable storage medium encoded with instructions for execution by a policy server for distributing policy information, the medium including: instructions for receiving, at the policy server, a request message from a network device, the request message including a subscriber IP address and a network device identifier; instructions for identifying a subscriber session associated with the IP address; instructions for recording the network device identifier in association with the subscriber session; instructions for retrieving a policy associated with the subscriber session; and instructions for transmitting the policy to the network device.

Various embodiments are described wherein the request message further includes a peer device identifier associated with a peer device of the network device, the method further including: recording the peer device identifier in association with the subscriber session; and transmitting the policy to the peer device.

Various embodiments are described wherein identifying the subscriber session includes retrieving a subscriber identifier associated with the subscriber IP address.

Various embodiments additionally include determining that the policy has changed to a new policy; and transmitting the new policy to the network device based on the recorded network device identifier associated with the subscriber session.

Various embodiments additionally include determining that the session has been terminated; and instructing the network device to remove the policy based on the session having been terminated.

BRIEF DESCRIPTION OF THE DRAWINGS

In order to better understand various exemplary embodiments, reference is made to the accompanying drawings, wherein:

FIG. 5 illustrates an exemplary component diagram of a policy server;

FIG. 6 illustrates an exemplary data arrangement for storing session information;

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Establishing functionality in auxiliary NAS devices introduces new challenges to the dynamic management of subscriber sessions. For example, while a subscriber session may be established at a primary NAS, the auxiliary NAS may not have automatic access to session information relevant to the auxiliary functionality. This problem of providing an auxiliary NAS with session information, such as policies to enforce, is compounded by possibilities that an auxiliary NAS may serve multiple primary NASs and may be paired with multiple peer auxiliary NASs. Accordingly, it would be desirable to provide a system and method capable of dynamically informing auxiliary NASs of policy and other session information associated with newly-established sessions.

Figure 1:
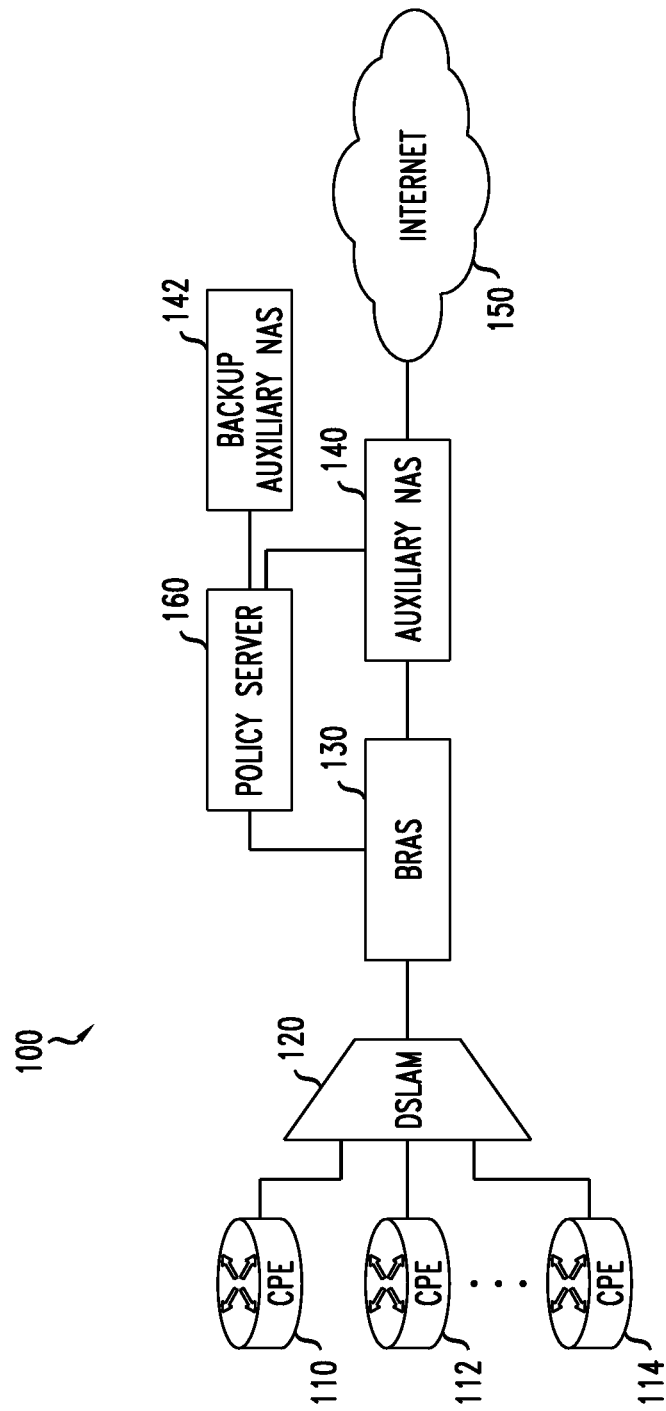
FIG. 1 illustrates an exemplary environment including an auxiliary NAS deployment.

FIG. 1 illustrates an exemplary environment 100 including an auxiliary NAS deployment. The environment 100 may be an access network configured and arranged to provide subscribers with access to a network such as, for example, the Internet 150. As such, one or more customer premise equipments (CPEs) 110, 112, 114 may be attached to the network 100. Each CPE 110, 112, 114 may attach to one or more end user devices (not shown) operated by subscribers. For example, the CPEs 110, 112, 114 may provide network access to various devices such as mobile devices, tablets, personal computers, laptops, servers, blades, television set top boxes, televisions, video game consoles, and other network-enabled electronics. As such, the CPEs 110, 112, 114 may be routers, switches, or any device capable of serving as a customer terminal for access network 100. Network traffic associated with the CPEs 110, 112, 114 may be aggregated by an aggregation device, such as a digital subscriber line access multiplexer (DSLAM) 120. The DSLAM 120 may combine traffic from the CPEs 110, 112, 114 into a single traffic stream for forwarding along network 100. The DSLAM 120 may also perform the inverse function of separating return traffic into appropriate traffic streams to be forwarded back to the CPEs 110, 112, 114.

The exemplary network 100 may include a primary NAS such as a broadband remote access server (BRAS) 130. The BRAS 130 may route traffic from one or more DSLAMs 120 toward the Internet 150. The BRAS 130 may perform additional functions with respect to forwarded traffic such as, for example, enforcing QoS policies and monitoring subscriber data usage. Various additional functions for performance by the BRAS 130 will be apparent. In various embodiments, the BRAS 130 may establish sessions with the end user devices for the purpose of providing the various functionalities described. For example, the BRAS 130 may, for each specific subscriber, maintain a session and associated policy information. This policy information, in turn, may indicate how the BRAS 130 should perform its functions. For example, a policy may specify for a specific subscriber or session a specific QoS that should be enforced.

The network 100 may also include one or more auxiliary NAS devices 140. These auxiliary NAS devices may be deployed in-line with the BRAS 130 to provide additional processing to traffic before it is forwarded to the Internet 150 or back toward the CPEs 110, 112, 114. Various functionalities for implementation in an auxiliary NAS device will be apparent. As one example, the auxiliary NAS 140 may be a DPI device configured to apply traffic management based on various policies and the application associated with the traffic. As with the BRAS 130, the policies applied by an auxiliary NAS 140 for functions such as traffic management may be specific to the subscriber or session. Further, the auxiliary NAS 140 may operate in conjunction with one or more peer devices, such as a backup auxiliary NAS 142. The backup auxiliary NAS 142 may be operated in a redundant mode such that, if the auxiliary NAS 140 fails, the backup auxiliary NAS 142 may be capable of performing the functions of the auxiliary NAS 140 with respect to at least some of the sessions previously processed by auxiliary NAS 140. As such, the backup auxiliary NAS 142 may also utilize subscriber-specific or session-specific policies. Various additional uses for peer devices will be apparent.

The network 100 may also include a policy server 160 configured to provide various session information, such as policies, to the BRAS 130, auxiliary NAS 140, and backup auxiliary NAS 142. For example, upon the BRAS 130 establishing a new session, the BRAS 130 may send an identifier of the subscriber to the policy server 160. Then, based on subscription information associated with the subscriber ID, the policy server 160 may generate one or more policies for installation at the BRAS 130. In various embodiments, the policy server 160 may be configured to provide the same or different policy information to the auxiliary NAS 140 and backup auxiliary NAS 142 upon request or automatically. Communications between the policy server 160 and other components of the network may be conducted according to an authentication, authorization, and accounting system protocol such as RADIUS or Diameter.

Figure 2:
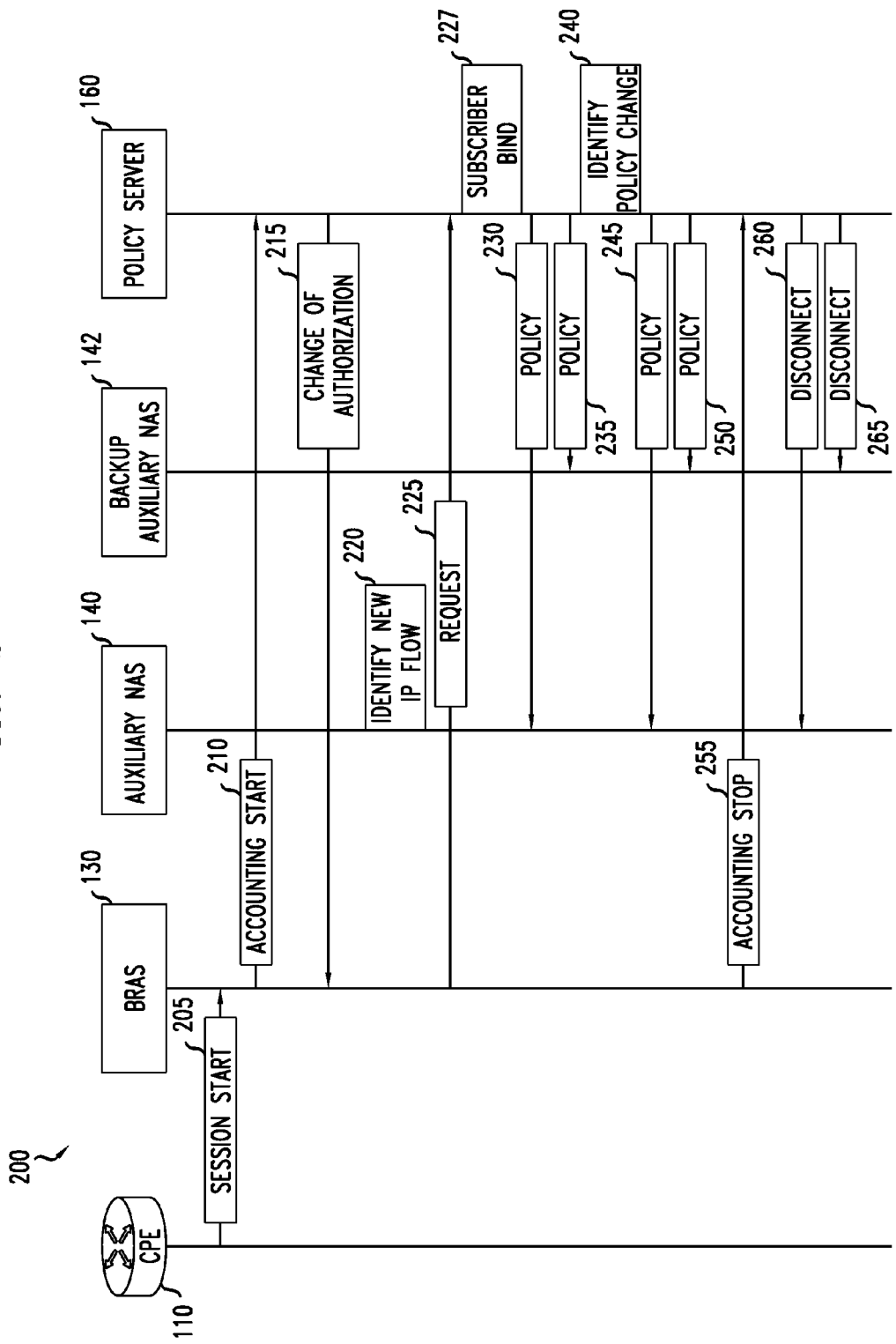
FIG. 2 illustrates an exemplary message exchange for providing session information to an auxiliary NAS.

FIG. 2 illustrates an exemplary message exchange 200 for providing session information to an auxiliary NAS. The message exchange 200 may occur between the various components of the exemplary network 100.

The message exchange may begin with a CPE 110 sending a message 205 to the BRAS 130 requesting that a new session be created for a subscriber. The BRAS 130 may then forward an "accounting start" message 210 to the policy server 160 to request establishment of the new session. The policy server 160 may establish the session and respond with a "change of authorization" (CoA) message 215 indicating the success of the session creation and installing any policies or other session information used by the BRAS 130 to begin forwarding traffic associated with the new session. In some embodiments, the CoA message 215 may be optional or unused. After sending the accounting start message 210, the BRAS 130 may allow such traffic to pass toward the Internet 150, via the auxiliary NAS 140.

At this point, the auxiliary NAS 140 may not store any information, such as policy information, regarding the newly-established session. In various embodiments, the policy server 160 may not be preconfigured with a correspondence between the BRAS 130 and auxiliary NAS 140 and, as such, may be unable to push policy information to the auxiliary NAS 140 at the same time the CoA message 215 is transmitted. For example, in embodiments wherein the BRAS 130 may connect to multiple auxiliary NAS devices 140 or wherein the devices migrate within the network, manual configuration may be impractical. As such, various embodiments may place the responsibility of providing auxiliary NAS devices with policy information on the auxiliary NAS 140 itself.

Once the BRAS 130 begins forwarding traffic associated with the new session, the auxiliary NAS 140 may identify the presence of a new IP flow in the traffic processed at step 220. In various embodiments, the auxiliary NAS may be configured to correlate all traffic with a known session; if no correlated session is found locally, the auxiliary NAS 140 may determine that the traffic is associated with a new session. Based on this determination, the auxiliary NAS may generate a request message 225 to report the new session to the policy server 160 and request the provision of relevant session information, such as a traffic management policy selected for the session. The request message 225 may include various information such as a subscriber IP extracted from the new session, an IP address and port of the auxiliary NAS 140, and an IP address and port of a backup auxiliary NAS (or other peer device) 142 associated with the port of the auxiliary NAS 140.

Next, the policy server may perform various operations as part of subscriber binding 227 between the session and the reported subscriber. Using the subscriber IP address, the policy server 160 may identify the session previously established based on the accounting start message 210 as being the new session reported by the auxiliary NAS 140. The policy server 160 may store the identifiers of the auxiliary NAS 140 and backup auxiliary NAS 142 in association with the session for future reference. Additionally, the policy server 160 may locate any session information that will be used by the auxiliary NAS devices 140, 142 and transmit this information. For example, in embodiments where the auxiliary NAS devices 140, 142 perform a DPI traffic management function, the policy server 160 may transmit traffic management policies for the session to the auxiliary NAS devices 140, 142 in response messages 230, 235 respectively. The auxiliary NAS 140 may thereafter perform the desired function on the new session traffic using the newly-acquired session information.

By saving the identifiers of the auxiliary NAS devices 140, 142, the policy server 160 may be capable of pushing session updates to the auxiliary NAS devices 140, 142 without first receiving a request. For example, at some point after session establishment, the policy server may determine 240 that the policy should be changed or has been changed with respect to the session. Using the previously-stored auxiliary NAS device 140, 142 identifiers, the policy server 160 may transmit the new policies to the auxiliary NAS devices 140, 142 in policy messages 245, 250, respectively.

As another example, at some point after session establishment, the BRAS 130 may send an "accounting stop" message 255 to the policy server 160, indicating that the session should be terminated. To facilitate session cleanup, the policy server may utilize the previously-stored auxiliary NAS device 140, 142 identifiers to push disconnect messages 260, 265 to the auxiliary NAS device 140, 142, indicating that the session will be terminated.

Various embodiments may employ additional improvements. In some embodiments, the policy server 160 may be configured to initiate cleanup by pushing disconnect messages based on other triggers. For example, the policy server 160 may push disconnect messages to appropriate auxiliary NAS devices upon the subscriber being deleted from a subscription profile repository (SPR) or similar subscriber database or upon receiving an accounting start message that conflicts with a previously-established session. In some embodiments, the policy server 160 may not receive an accounting stop message sent by the BRAS 130 for a first session or a first session may become stale. Then, when the BRAS 130 sends an accounting start message to establish a second session, the policy server may determine that the first session should have been terminated. To ensure proper operation of the auxiliary NAS devices 140, 142, the policy server 160 may send disconnect messages to the auxiliary NAS devices 140, 142, to clean up the first session. In some such embodiments, the policy server 160 may send such messages to the auxiliary NAS devices 140, 142 prior to establishing the second session or prior to reporting the establishment of the second session to the BRAS 130.

Figures 3, 4:
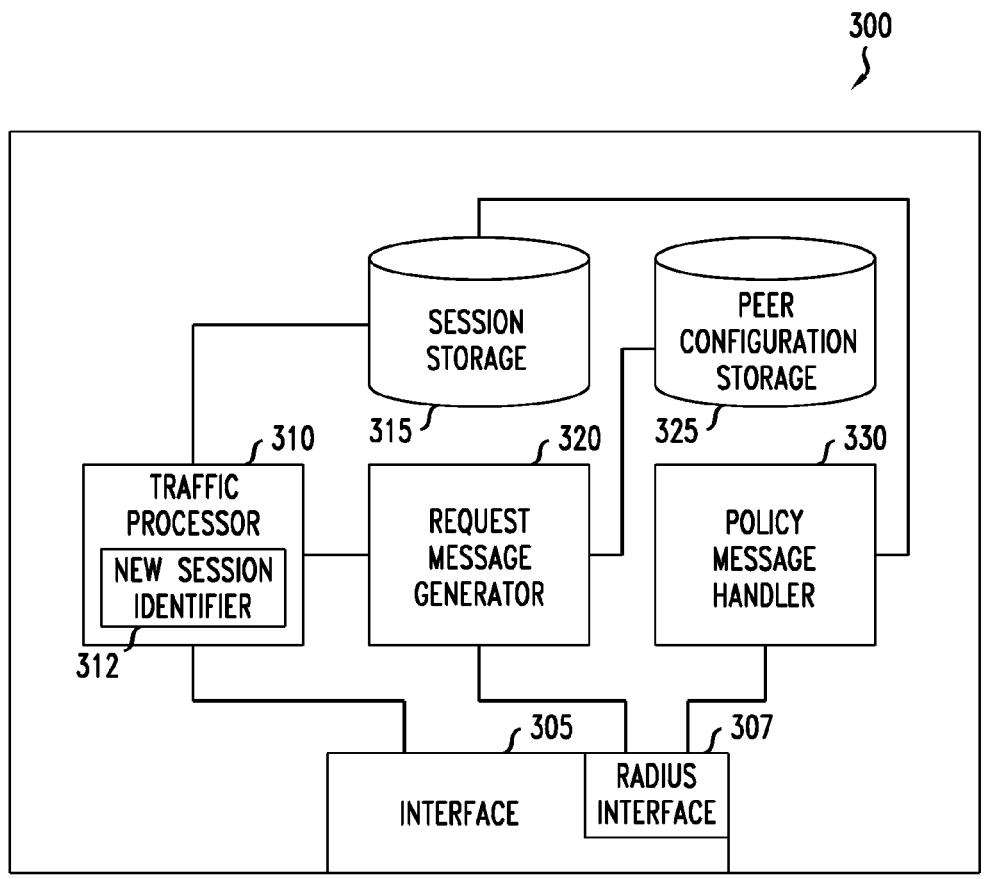
FIG. 3 illustrates an exemplary component diagram of an auxiliary NAS.
FIG. 4 illustrates an exemplary data arrangement for storing peer configurations.

FIG. 3 illustrates an exemplary component diagram of an auxiliary NAS 300. The auxiliary NAS 300 may correspond to the auxiliary NAS 140 or backup auxiliary NAS 142 of the exemplary network 100. It will be understood that the components described herein will be implemented using, or supported by, hardware such as, for example, a processor and memory. Further, multiple components may share such hardware components. The auxiliary NAS 300 may include an interface 305, a traffic processor 310, session storage 315, request message generator 320, peer configuration storage 325, and policy message handler 330.

The interface 305 may include an interface including hardware or executable instructions encoded on a machine-readable storage medium configured to communicate with other devices. For example, the interface 305 may include an Ethernet or TCP/IP interface. In some embodiments, the interface 305 may include multiple physical or logical ports. The interface 305 may also enable communication according to the RADIUS protocol and, as such, may be seen as including a RADIUS interface 307. The RADIUS interface 307 may correspond to a RADIUS stack built on top of the interface 305. In various embodiments, the interface 305 may alternatively or additionally enable communications according to other protocols. For example, the interface 305 may implement a Diameter stack.

The traffic processor 310 may include hardware or executable instructions encoded on a machine-readable storage medium configured to receive network and transmit network traffic via the interface 305. The traffic processor 310 may also be configured to perform various functions with respect to the traffic. For example, in embodiments where the auxiliary NAS 300 is a DPI traffic management device, the traffic processor may be configured to analyze the payload of received packets and perform traffic management based on a policy associated with a specific session.

The traffic processor 310 may also be configured to identify new sessions for which policy or other session information is unavailable. As such, the traffic processor 310 may be viewed as including a new session identifier 312. The new session identifier 312 may be configured to recognize, from traffic received via the interface 305, that a received traffic message is associated with a subscriber IP for which the session storage 315 does not store appropriate session information. The new session identifier 312 functionality may be implemented as an exception in the normal operation of traffic processor 310 that occurs when the traffic processor 310 unsuccessfully attempts to retrieve a session record for a received packet. Alternative implementations for the new session identifier 312 will be apparent.

The session storage 315 may include a machine-readable storage medium configured to store session information useful to the traffic processor in performing desired functions with respect to network traffic. Accordingly, the session storage 315 may include hardware such as read-only memory (ROM), random-access memory (RAM), magnetic disk storage media, optical storage media, flash-memory devices, and/or similar storage media. In various embodiments, the session storage 315 may store policy information in association with a session identifier, such as an incoming port or a subscriber IP address.

Upon identifying a new session, the traffic processor 310 or new session identifier 312 may pass the traffic message representing the new session to the request message generator 320. The request message generator 320 may include hardware or executable instructions encoded on a machine-readable storage medium configured to generate and transmit a request message to a policy server via the RADIUS interface 307 (or other appropriate interface). The request message may be generated to request session information from the policy server and, as such, may be regarded as a type of request message. In various embodiments, the request message may include information such as, for example, a subscriber IPv4 or IPv6 address extracted from the received traffic message, an identifier of the auxiliary NAS 300, and an identifier of one or more peer devices such as an active or backup auxiliary NAS. The identifiers may include various values suitable for identifying a device within the network 100 such as, for example, an IP address of the device, a port of the device, or another assigned identifier. When including a peer identifier in the request message, the request message generator may retrieve the peer identifier from the peer configuration storage 325. In various embodiments, different peer devices may be associated with different incoming addresses or ports of the auxiliary NAS 300; in such embodiments, the request message generator 320 may have access to the IP address or port number over which the traffic message was received.

The peer configuration storage 325 may include a machine-readable storage medium configured to store identifications of peer devices. Accordingly, the peer configuration storage 325 may include hardware such as read-only memory (ROM), random-access memory (RAM), magnetic disk storage media, optical storage media, flash-memory devices, and/or similar storage media. Exemplary contents for the peer configuration storage 325 will be described in greater detail below with respect to FIG. 4. In some embodiments, the peer configuration storage 325 may reside on the same physical device as the policy storage 315.

The policy message handler 330 may include hardware or executable instructions encoded on a machine-readable storage medium configured to process a policy message received via the RADIUS interface 307 (or other appropriate interface) in response to a previously transmitted request message. As such, the policy message may be a type of response message. Upon receiving a policy message, the policy message handler 330 may identify an associated session or subscriber IP, extract a policy from the policy message handler 330, and store the policy in association with the session or subscriber IP in the policy storage 315 for future use by the traffic processor 310. In various embodiments, the policy message handler 330 may be configured to additionally handle messages that are pushed to the auxiliary NAS 300 by the policy server. For example, the policy message handler 330 may extract and save a policy carried by a such a pushed message or may remove a policy from the policy storage 315 based on a pushed message that indicates that a session has been terminated.

FIG. 4 illustrates an exemplary data arrangement 400 for storing peer configurations. The data arrangement 400 may describe the contents of the peer configuration storage 325. The data arrangement 400 may be stored as an array, table, series of linked list, or in any other manner useful for storing records of peer devices.

The data arrangement 400 may include multiple fields such as a self field 405 and a peer field 410. The self field 405 may identify an incoming address or port to which a peer record applies. In this way, the auxiliary NAS 300 may associate different peer devices with different traffic, depending on which interface or port receives the traffic. In some embodiments, the auxiliary NAS may not associate different peer devices with different traffic; in such embodiments, the self field 405 may not be present. The peer field 410 may identify one or more peer devices associated with a particular record.

As an example, record 415 may indicate that, for traffic received over an interface associated with IP address 213.124.1.1 and over port 2, the appropriate peer device is accessed at IP address 213.124.21.1 at port 2. As another example, record 420 may indicate that, for traffic received over the interface associated with IP address 213.124.1.1 and over port 5, the appropriate peer device is accessed at IP address 213.124.1.81 and over port 3. The data arrangement 400 may include numerous additional records 425. Further, alternative methods for associating peer devices with an auxiliary NAS will be apparent.

FIG. 5 illustrates an exemplary component diagram of a policy server 500. The policy server 500 may correspond to the policy server 160 of the exemplary network 100. It will be understood that the components described herein will be implemented using, or supported by, hardware such as, for example, a processor and memory. Further, multiple components may share such hardware components. The policy server may include a RADIUS interface 505, BRAS message handler 510, session storage 515, auxiliary NAS message handler 520, policy transmitter 525, and policy engine 530.

The RADIUS interface 505 may include an interface including hardware or executable instructions encoded on a machine-readable storage medium configured to communicate with other devices. For example, the RADIUS interface 505 may include an Ethernet or TCP/IP interface. In some embodiments, the RADIUS interface 505 may include multiple physical or logical ports. The RADIUS interface 505 may also enable communication according to the RADIUS protocol and, as such, may include a RADIUS stack built on top of the lower level interface hardware. In various embodiments, the lower level hardware of the RADIUS interface 505 may enable communications according to alternative or additional protocols. For example, the policy server may, instead, include a Diameter stack.

The BRAS message handler 510 may include hardware or executable instructions encoded on a machine-readable storage medium configured to receive, handle, and respond to messages received from a BRAS via the RADIUS interface 505. For example, the BRAS message handler 510 may receive an accounting start message requesting the establishment of a new session. In response, the BRAS message handler may create a new session record in session storage, invoke the policy engine 530 to receive one or more QoS, traffic management, or other polices, and save such policies in the session record. The BRAS message handler 510 may also transmit session information back to the BRAS in a CoA message. In various embodiments, the BRAS message handler 510 may be capable of processing and responding to additional messages such as accounting stop messages. Some such messages may prompt the BRAS message handler 510 to instruct the auxiliary NAS message handler 520 or policy transmitter 525 to transmit information (such as an session information or a disconnect message) to one or more auxiliary NAS devices. Modifications to process such additional messages will be apparent.

The session storage 515 may include a machine-readable storage medium configured to store session information regarding active sessions. Accordingly, the session storage 515 may include hardware such as read-only memory (ROM), random-access memory (RAM), magnetic disk storage media, optical storage media, flash-memory devices, and/or similar storage media. Exemplary contents for the session storage 515 will be described in greater detail below with respect to FIG. 6.

The auxiliary NAS message handler 520 may include hardware or executable instructions encoded on a machine-readable storage medium configured to receive, handle, and respond to messages received from an auxiliary NAS. For example, the auxiliary NAS message handler 520 may receive and process a request message from an auxiliary NAS. Upon receiving a request message, the auxiliary NAS message handler 520 may extract a subscriber IP from the message and locate an associated session stored in session storage 515, and store any auxiliary NAS identifiers carried by the request message in association with the session in the session storage. In various embodiments, location of the session may include referring to a subscriber database, such as a subscription profile repository, to determine a customer identifier associated with the reported IP. The customer identifier may then be used to locate a session record.

In some embodiments, a subscriber may be associated multiple sessions established on the policy server 500. In some such embodiments, the auxiliary NAS message handler 520 may receive multiple request messages based on the multiple sessions, aggregate these messages based on the common IP address or subscriber ID, and respond to the aggregated requests, thereby reducing the number of response messages. Alternatively, the auxiliary NAS may have aggregated multiple flows into a single request message for processing by the policy server 500.

The policy transmitter 525 may include hardware or executable instructions encoded on a machine-readable storage medium configured to, upon instruction by the auxiliary NAS message handler 520, transmit one or more policies to an auxiliary NAS device. For example, after the auxiliary NAS message handler processes a request message, the policy transmitter may retrieve any policies stored for the session from the session storage 515 and transmit the policies to any auxiliary NAS devices identified by the session record in the session storage 515.

The policy engine 530 may include hardware or executable instructions encoded on a machine-readable storage medium configured to generate various policies to be applied to sessions. For example, upon creation of a session as requested by a BRAS, the policy engine 530 may generate QoS and traffic management policies, which may then be stored in the session storage 515 as part of a session record. Additionally, the policy engine 530 may periodically generate updated policies for existing sessions based on, for example, a predetermined schedule or an instruction from another component of policy server 500 or another device. Upon generating updated policies, the policy engine 530 may instruct the policy transmitter to forward the new policies to any appropriate auxiliary NAS devices, as reported by a previously-processed request message.

FIG. 6 illustrates an exemplary data arrangement 600 for storing session information. The data arrangement 600 may describe the contents of the session storage 515. The data arrangement 600 may be stored as an array, table, series of linked list, or in any other manner useful for storing records of existing sessions.

The data arrangement 600 may include multiple fields such as a customer ID field 605, IP address field 610, BRAS field 615, auxiliary NAS field 620, backup auxiliary NAS field 625, and policies field 630. The customer ID field 605 may include a unique identifier for a subscriber to which a session belongs. The IP address field 610 may include one or more IP addresses used by the subscriber in connection with the session. The BRAS field 615 may store an identification of a BRAS which serves the session. The auxiliary NAS field 620 may store an identification of one or more auxiliary NAS devices which serve the session. The backup auxiliary NAS field 625 may store an identification of an auxiliary NAS which serves as a backup for the auxiliary NAS of field 620 with respect to the session. Fields 620, 625 may be blank for newly-established sessions for which request messages have not yet been received and processed. The policies field 630 may store various policies that are to be applied to the session. In various embodiments, a session may be associated with multiple types of policies such as, for example, QoS and traffic management policies; in such embodiments, the policies field 630 may be split into multiple fields or may store indications of policy type along with each policy stored therein.

As an example, session record 635 may indicate that a session exists wherein subscriber 0x01 uses IP address 213.67.98.166 to connect to the Internet via the BRAS located at 213.67.122.1. This session utilizes the auxiliary NAS at 213.124.1.1, accessed through port 2. Further, the session is associated with a backup auxiliary NAS at 213.124.21.1, accessed through port 2. The session includes two policies that block all Bittorrent traffic and limit total data usage to 50 gigabytes of transfer per billing period.

As another example, session record 640 may indicate that a session exists wherein subscriber 0x02 uses IP address 213.71.125.36 to connect to the Internet via the BRAS located at 213.71.58.1. This session utilizes the auxiliary NAS at 213.124.1.1, accessed through port 5. Further, the session is associated with a backup auxiliary NAS at 213.124.1.81, accessed through port 3. The session includes two policies that throttle video traffic to 80% of a reference value and notifies the user when 10 gigabytes of video data is transferred within a billing period. The data arrangement may include multiple additional session records 645.

Figure 7:
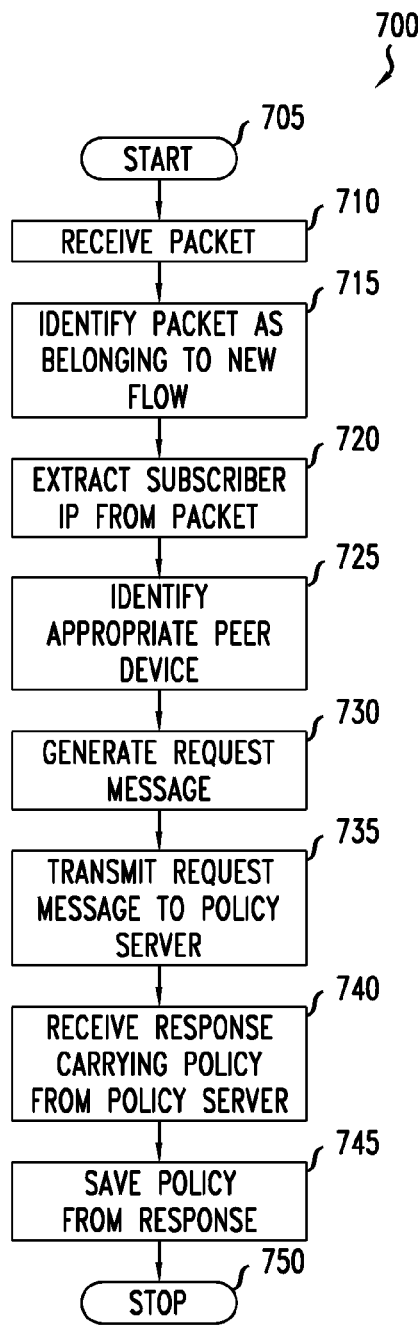
FIG. 7 illustrates an exemplary method for requesting session information from a policy server.

FIG. 7 illustrates an exemplary method 700 for requesting session information from a policy server. The method 700 may be performed by the components of an auxiliary NAS device 300 such as the traffic processor 310, request message generator 320, and policy message handler 330.

The method may begin in step 705 and proceed to step 710 where the auxiliary NAS device 300 may receive a traffic packet for processing. Then, in step 715, the auxiliary NAS device 300 may identify the received packet as belonging to a new traffic flow for which session information is not available. The auxiliary NAS device 300 may then begin the process of requesting the appropriate session information by, in step 720, extracting one or more subscriber IP addresses from the received traffic packet. Additionally, in implementations where the auxiliary NAS device 300 operates in conjunction with a peer device, the auxiliary NAS device 300 may, in step 725, identify an appropriate peer device for association with the new session. For example, based on the port over which the traffic message was received in step 710, the auxiliary NAS device 300 may identify an address and port of a backup auxiliary NAS device. Then, using the information obtained in steps 720, 725, along with the address and port of the auxiliary NAS device 300 itself, the auxiliary NAS device 300 may generate a request message in step 730 and transmit the request message to the policy server in step 735. In some embodiments, the request message may specify what session information is requested, such as traffic management policies, or may identify the type of auxiliary NAS device 300, from which the policy server may determine which session information is appropriate to send.

At some point after transmitting the request message, the auxiliary NAS device 300 may receive a response from the policy server in the form of a policy message in step 740. This policy message may include one or more policies that should be enforced by the auxiliary NAS 300 with respect to the new session. The auxiliary NAS device 300 may store this policy in step 745 in association with the flow for later use in processing traffic. In some embodiments, the policy server may send additional policy information that may not be used by the auxiliary NAS device 300. In such embodiments, the auxiliary NAS device 300 may store only that session information that will actually be used in processing traffic or may store all received session information. The method 700 may then proceed to end in step 750.

Figure 8:
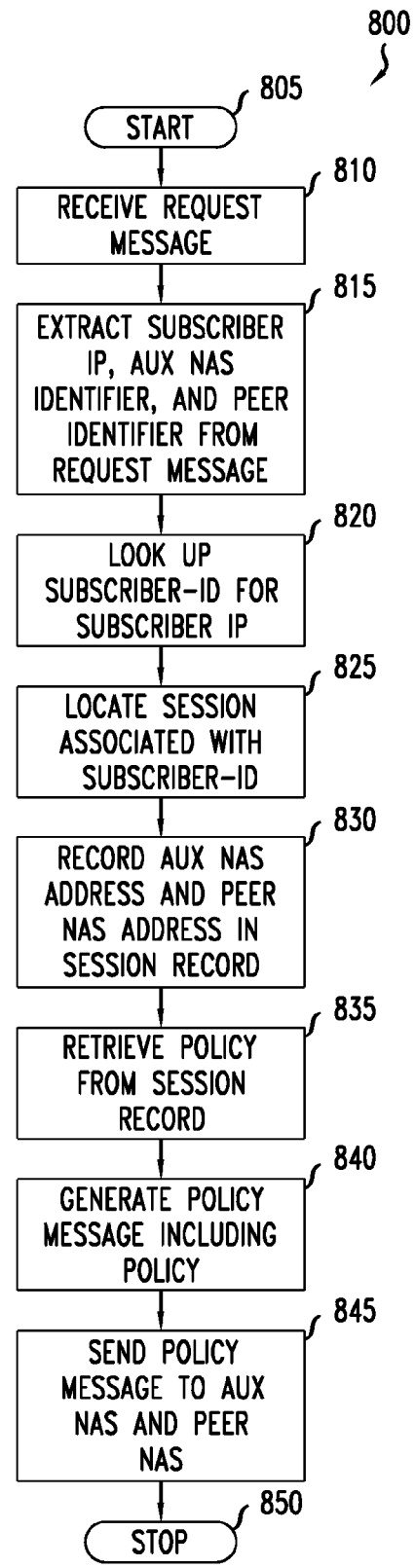
FIG. 8 illustrates an exemplary method for providing session information to auxiliary NAS devices.

FIG. 8 illustrates an exemplary method 800 for providing session information to auxiliary NAS devices. The method 800 may be performed by the components of a policy server 500 such as the auxiliary NAS message handler 520 and policy transmitter 525.

The method 800 may begin in step 805 and proceed to step 810 where the policy server 500 may receive a request message from an auxiliary NAS device. The policy server 500 may then begin to process the request message in step 815 by extracting information from the message such as a subscriber IP address, auxiliary NAS identifier, and peer auxiliary NAS identifier. Then, in step 820, the policy server 500 may identify a subscriber identifier associated with the extracted subscriber IP address by, for example, referring to a subscriber database to locate the subscriber to which the extracted IP address is allocated. Using the subscriber ID, the policy server 500 may identify a session established for that subscriber in step 825. In step 830, the policy server 500 may update the located session with the new information. For example, the policy server 500 may record the identifiers for the auxiliary NAS and peer auxiliary NAS extracted in step 815 in the session record identified in step 825.

Next, the policy server 500 may begin generating a response to the request message by retrieving one or more policies from the session record in step 835. In various embodiments, the policy server 500 may simply retrieve all available policies or may select only those policies that will be used by the auxiliary NAS. For example, the policy server 500 may determine based on the content of the request message or based on the policy server's 500 knowledge of the identified auxiliary NAS device that only policies of a particular type should be transmitted. After locating the policies for transmission, the policy server 500 may generate a policy message in step 840 including the located policies and transmit the policy message to the auxiliary NAS and any identified peer auxiliary NAS devices in step 845 for policy installation. The method 800 may then proceed to end in step 850.

It will be apparent that various modifications may be made to the methods described herein. For example, step 825 may be performed based on the reported subscriber IP (instead of the subscriber identifier), prior to performance of step 820. Then, step 820 may be performed to locate the associated subscriber identifier and profile to utilize the additional information.

Figure 9:
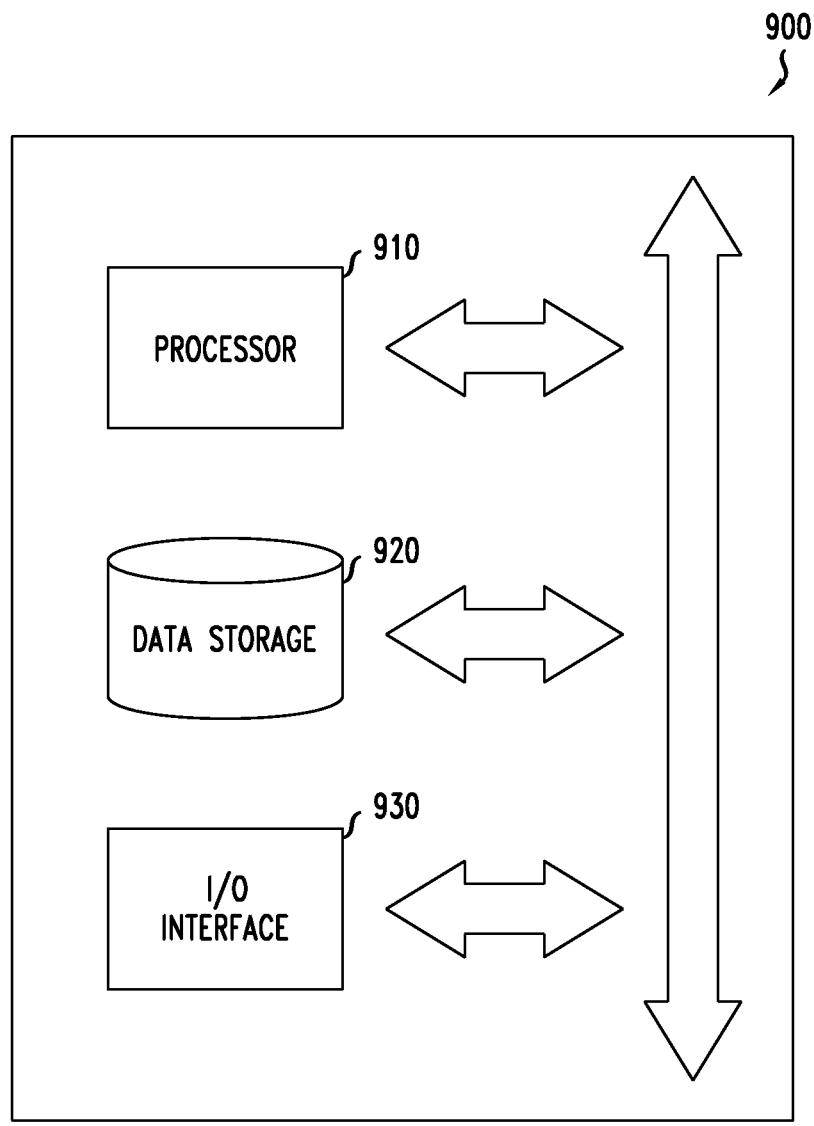
FIG. 9 illustrates an exemplary component diagram of hardware implementing a NAS or policy server.

FIG. 9 illustrates an exemplary component diagram of hardware 900 implementing a NAS or policy server. The hardware 900 may correspond to the auxiliary NAS 140, backup auxiliary NAS 142, or policy server 160 of the exemplary network 100. The hardware 900 may include a processor 910, data storage 920, and an input/output (I/O) interface 930.

The processor 910 may control the operation of the hardware 900 and cooperate with the data storage 920 and the I/O interface 930, via a system bus. As used herein, the term "processor" will be understood to encompass a variety of devices such as microprocessors, field-programmable gate arrays (FPGAs), application-specific integrated circuits (ASICs), and other similar processing devices.

The data storage 920 may store program data such as various programs useful in implementing the functions described above. For example, the data storage 920 may store instructions for implementing method 700 or method 800. Additionally, data storage 920 may store data used during operation such as session information or peer configuration information The I/O interface 930 may cooperate with the processor 910 to support communications over one or more communication channels. For example, the I/O interface 930 may include a user interface, such as a keyboard and monitor, and/or a network interface, such as one or more Ethernet ports.

In some embodiments, the processor 910 may include resources such as processors/CPU cores, the I/O interface 930 may include any suitable network interfaces, or the data storage 920 may include memory or storage devices such as magnetic storage, flash memory, random access memory, read only memory, or any other suitable memory or storage device. Moreover the hardware 900 may be any suitable physical hardware configuration such as: one or more server(s), blades consisting of components such as processor, memory, network interfaces or storage devices.

According to the foregoing, various embodiments described herein may enable the flexible provision of session information to auxiliary NAS devices. By configuring an auxiliary NAS to identify new traffic flows and request session information from a policy server, policy and other session information may be provided to auxiliary NAS devices without requiring manual association of auxiliary NAS devices to primary NAS devices or peer devices.

It should be apparent from the foregoing description that various exemplary embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media. Further, as used herein, the term "processor" will be understood to encompass a microprocessor, field programmable gate array (FPGA), application-specific integrated circuit (ASIC), or any other device capable of performing the functions described herein.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a network device for obtaining policy information, the method comprising:
   receiving, at the network device, session traffic known to the network device and a traffic message associated with a session that is unknown to the network device including an IP address;
   identifying the traffic message as belonging to a new IP flow;
     generating a request message based on identifying the traffic message as belonging to the new IP flow, wherein the request message includes the IP address;
     transmitting the request message to a policy server; and
     receiving, from the policy server, a policy message including a policy.

2. The method of claim 1, wherein the request message further includes an identifier of the network device.

3. The method of claim 2, further comprising:
   identifying a peer device associated with the network device,
   wherein the request message further includes an identifier of the peer device.

4. The method of claim 3, wherein identifying a peer device comprises:
   determining an incoming port associated with the traffic message; and
   identifying the peer device as being associated with the incoming port.

5. The method of claim 1, wherein the network device is a network access server (NAS).

6. The method of claim 1, wherein the request message and the policy message are both RADIUS messages.

7. A network device for obtaining policy information, the network device comprising:
   a network interface configured to receive session traffic known to the network device and a traffic message associated with a session that is unknown to the network device including an IP address;
   a traffic processor configured to identify the traffic message as belonging to a new IP flow;
   a request message generator configured to:
     generate a request message based on identifying the traffic message as belonging to the new IP flow, wherein the request message includes the IP address, and
     transmit the request message to a policy server via the network interface; and
   a response message handler configured to receive, from the policy server, a policy message including a policy.

8. The network device of claim 7, wherein the request message further includes an identifier of the network device.

9. The network device of claim 8, wherein:
   the request message generator is further configured to identify a peer device associated with the network device, and
   the request message further includes an identifier of the peer device.

10. The network device of claim 9, wherein, in identifying a peer device, the request message generator is configured to:
    determine an incoming port associated with the traffic message; and
    identify the peer device as being associated with the incoming port.

11. The network device of claim 7, wherein the network device is a network access server (NAS).

12. The network device of claim 7, wherein the request message and the policy message are both RADIUS messages.

13. A method performed by a policy server for distributing policy information, the method comprising:
    receiving, at the policy server, a request message from a network device that receives session traffic known to the network device and a traffic flow for which session information is not available, the request message including a subscriber IP address and a network device identifier from the traffic flow;
    identifying a subscriber session associated with the IP address;
    recording the network device identifier in association with the subscriber session;
    retrieving a policy associated with the subscriber session; and
    transmitting the policy to the network device.

14. The method of claim 13, wherein the request message further includes a peer device identifier associated with a peer device of the network device, the method further comprising:
    recording the peer device identifier in association with the subscriber session; and
    transmitting the policy to the peer device.

15. The method of claim 13, wherein identifying the subscriber session comprises retrieving a subscriber identifier associated with the subscriber IP address.

16. The method of claim 13, further comprising:
    determining that the policy has changed to a new policy; and transmitting the new policy to the network device based on the recorded network device identifier associated with the subscriber session.

17. The method of claim 13, further comprising:
determining that the session has been terminated; and
instructing the network device to remove the policy based on the session having been terminated.

18. A policy server for distributing policy information, the policy server comprising:
a network interface configured to receive a request message from a network device that receives session traffic known to the network device and a traffic flow for which session information is not available, the request message including a subscriber IP address and a network device identifier from the traffic flow;
a request message handler configured to:
identify a subscriber session associated with the IP address, and
record the network device identifier in association with the subscriber session; and
a policy transmitter configured to:
retrieve a policy associated with the subscriber session; and
transmit the policy to the network device via the network interface.

19. The policy server of claim 18, wherein:
the request message further includes a peer device identifier associated with a peer device of the network device,
the request message handler is further configured to record the peer device identifier in association with the subscriber session, and
the policy transmitter is further configured to transmit the policy to the peer device.

20. The policy server of claim 18, wherein, in identifying the subscriber session, the request message handler is configured to retrieve a subscriber identifier associated with the subscriber IP address.

21. The policy server of claim 18, wherein the policy transmitter is further configured to:
determine that the policy has changed to a new policy; and
transmit the new policy to the network device based on the recorded network device identifier associated with the subscriber session.

22. The policy server of claim 18, wherein the policy transmitter is further configured to:
determine that the session has been terminated; and
instruct the network device to remove the policy based on the session having been terminated.

* * * * *